United States Patent Office 2,915,496
Patented Dec. 1, 1959

2,915,496

STABILITY OF POLYETHER GLYCOL URETHANE PRODUCTS

Gilbert H. Swart, George T. Gmitter, and Louis Nicholas, Akron, Ohio, assignors to The General Tire & Rubber Company, Akron, Ohio, a corporation of Ohio No Drawing. Application May 20, 1957
Serial No. 660,067

12 Claims. (Cl. 260—45.7)

This invention relates to polyurethane compositions and more particularly to polyether-polyurethane compositions which are resistant to aging and weathering.

In the past a great variety of polyurethane products have been made which are useful as coatings, foams, and elastomers. Such products are reaction products of a polyester or polyether glycol and a polyisocyanate and generally have excellent physical properties. However, the polyester-urethanes are degraded by long exposure to highly humid conditions particularly at elevated temperatures. Polyurethane compositions which are reaction products of long chain polyethers such as polypropylene glycol ethers and polyisocyanates are much more stable than polyester-urethanes to humidity degradation, but deteriorate from exposure to dry atmosphere.

Deterioration of the polyether portion of the polyurethane molecule is particularly severe when the polyether portion contains alkyl side chains as in propylene oxide or butylene oxide units. Attempts to stabilize polyurethane compositions to heat and light by addition of antioxidants normally used for rubber have been unsuccessful. The fact that the polyether-urethanes have not been stabilized against normal aging in dry atmospheres by the antioxidants generally considered most effective has led many to believe that something other than oxidative attack has caused their marked deterioration.

It is one object of the present invention to provide a polyurethane composition which is resistant to aging, weathering, and humidity, and a method of making the same.

It is another object of the present invention to provide reaction products of a polyisocyanate and a polyether glycol for use as coatings, foams, and elastomers which have improved age and weather resistant properties.

In accordance with the present invention, we have discovered that, while those antioxidants which have been most effective in rubbery polymers generally do not stabilize polyether-urethanes, antioxidants which have no active hydrogen atoms available for reaction with the polyisocyanates do provide polyether-urethane compositions, such as coatings, foams, elastomers, and the like, with greatly superior age and weather resistant properties. Apparently the degradation is caused by oxygen or ozone as initially suspected, but the difficulty with most antioxidants has heretofore been reaction between the isocyanate and the effective groups of the antioxidant. By using antioxidants which do not have active hydrogen containing groups, or antioxidants which do not depend on groups having active hydrogen atoms for their antioxidant property, or antioxidants which have such groups for example as hydroxyl and amine blocked off or sterically hindered so that the isocyanates cannot react with them, we have increased the life of polyether urethane foams many times.

The antioxidants of the present invention are generally organic compounds unreactive with polyisocyanates and preferably have relatively bulky alkyl groups of at least 3 carbon atoms or aryl groups positioned close to any potentially active hydrogen atoms so as to hinder reaction with isocyanate groups. Examples of the organic antioxidants are alkyl and aryl substituted phosphites, N,N'-dialkyl substituted phenylene diamines, and alkyl substituted hydroxy aryl compounds. Of the hydroxyl aryl compounds, phenols and hydroquinones are preferred. Even extremely small amounts such as 0.1% or 0.2% of one of the above mentioned antioxidants has a noticeable effect on improving aging properties of the foamed polyether-urethanes. When the amount of the antioxidant is increased to .5% of the weight of the polyurethane, superior results are obtained. However, we generally prefer to incorporate larger amounts such as about 1% to 3% of antioxidant based on the weight of the polyurethane. As much as 5% or so based on the weight of the polyurethane may be used if economic conditions warrant.

We have found that stability of polyether urethane to oxidation and light attack is much increased by incorporation of an alkyl substituted hydroxy aryl compound having an alkyl group of at least 3 carbon atoms located at a position ortho to each hydroxy group. Apparently the position of a somewhat bulky group on the aromatic nucleus is important since it blocks, or otherwise restricts, the activity of the hydrogen of the hydroxyl group so as to render it relatively unreactive with polyisocyanates but still permits a high activity in protection of the polyurethane against attack by oxygen. The hydroxy aryl compound may have any one of the following general formulae:

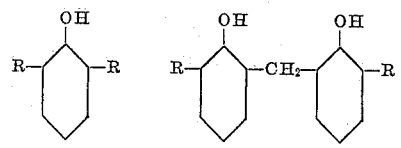

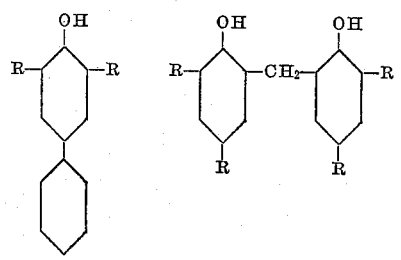

and where R is an alkyl group of 3 to 10 carbon atoms, such as isopropyl, butyl, secondary butyl, tertiary butyl, isohexyl and secondary octyl. The other ring substituents (atoms attached to ring carbon atoms) are preferably hydrogen but they may also be alkyl radicals of 1 to 2 carbon atoms. Examples of suitable hydroxy aryl compounds having at least one alkyl group at a position ortho to each —OH group are 2,5-ditertiary butyl para cresol, 2,2'-methylene bis (4-methyl-6-tertiary butyl phenol), 2,6-disecondary octyl phenol, and 2,6-diisobutyl phenol.

While in some cases not effective as the above-described polyaryl hydroxy compounds, we have discovered that polyurethane films, foamed products, and elastomers are stabilized by N,N'-dialkyl substituted phenylene diamines according to the formula

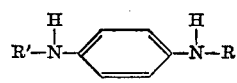

in which the amino groups are para to each other. The R and R' groups are alkyl groups of at least 3 carbon atoms and are preferably alkyl groups of 3 to 8 carbon atoms such as isopropyl, butyl, isobutyl, tertiary butyl, isohexyl, secondary octyl for the best heat and age stability, although alkyl groups of 12 to 14 carbon atoms may be attached to the amino nitrogen. The preferred structure of the alkyl groups is a relatively bulky branched chain group such as tertiary butyl and secondary octyl which apparently prevents the hydrogen atom attached to the amino nitrogen atom from reacting with polyisocyanates.

The most effective of the antioxidants found for the above purpose are the organic phosphites. When an organic phosphite is used, we have obtained the highest resistance to heat, oxidation, and weathering conditions in the polyether-urethane foams. In addition their resistance to humidity degradation, especially at elevated temperatures, is also retained. Another unexpected advantage obtained is an improvement in fire resistance of the polyurethane, especially in the cellular materials. Organic phosphites of the present invention are substituted organic phosphites of the general formula:

$$(TO)_3\text{—P}$$

where T is hydrogen, alkyl, aryl and alkaryl groups although where one of said T groups is hydrogen, at least two of the other T groups must be an alkyl, aryl or alkaryl group or mixtures of these groups as hereinafter described. For the best resistance to heating and weathering, the organic phosphite used is a tri aryl phosphite of the formula:

$$(Z\text{—Ar—O—})_3P$$

where Ar is an aromatic nucleus such as naphthyl, diphenyl and preferably phenyl, and where Z is an alkyl group of at least 4 carbon atoms and preferably 7 to 12 carbon atoms such as octyl, nonyl, decyl and dodecyl. Examples of preferred phosphites are tri (nonyl phenyl) phosphite, tri (octyl phenyl) phosphite and tri (decyl phenyl) phosphite. Other suitable phosphites are disubstituted phosphites such as di (nonyl phenyl) phosphite in which at least one of the groups which replaces the hydrogen atoms of the phosphite radical should contain an alkyl substituted aryl nucleus as above described. Other suitable phosphites that may be used in accordance with the present invention are trialkyl or triaryl substituted phosphites, or tri-substituted phosphites in which the substituents are mixed aryl and alkyl radicals having at least 3 carbon atoms. Examples of suitable tri-substituted phosphites are tributyl phosphite, tricresyl phosphite, heptyl-diphenyl phosphite, nonyl di-(tertiary butyl) phosphite, triphenyl phosphite, naphthyl-di(octyl) phosphite, and tri (nonyl phenyl) phosphite.

The organic antioxidant compounds are especially beneficial for polyalkylene ether glycol-urethanes, and in particular when the polyether contains alkyl side chains which are particularly vulnerable to degradation by humidity, aging and weathering. Thus, the greatest improvement is obtained with polyalkylene ether glycol urethanes containing alkylene oxide units, such as propylene, butylene, isobutylene, isopropylene, and ethylene glycols and polyglycols formed of mixtures of these. However, good age resistance is also obtained in the case of alkylene ether glycol-polyether urethanes from other polyalkylene ether glycols such as polytetramethylene ether glycol, polyneopentylene ether glycol, and polypentamethylene ether glycol and other bifunctional polyglycols of the general formula HO—$(RO_n)$—H where $n$ is an integer of 1 to 100 and R is an alkylene group such as isopropylene, ethylene, propylene, butylene, isobutylene, pentylene and the like or mixtures of these.

The reaction of an isocyanate group with an active hydrogen of a polyether forms a polymer with recurring linking units of the following general structure:

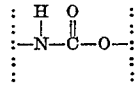

The long chain urethane polymer of the present invention has recurring units of the general formula:

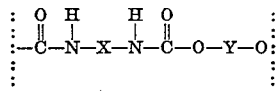

where X is a nucleus of a suitable organic diisocyanate as hereinafter described and —O—Y—O— is the residue of a polyether from reaction with an organic diisocyanate.

The polyethers used to prepare cellular polyurethane products preferably have a molecular weight above 700 but those with a molecular weight as low as 500 to 600, or as high as 3500 or even somewhat higher, may be used, depending on the type of foamed material desired. The amount and rate of crosslinking determines the type of foamed material and the greater the amount of crosslinking, the more rigid the foamed material, and thus many types of improved cellular polyurethanes may be prepared according to the present invention. Both the amount and rate of cross-linking may be controlled by the use of cross linked polyethers and/or the use of cross-linking agents such as triisocyanates which have three isocyanate groups to promote cross-linking between the linear polyether molecular chains. Thus the diisocyanates used in this invention may be substituted in part with triisocyanates, particularly when rigid foams are desired. Other suitable cross-linking agents are polyhydroxy compounds such as trimethylol propane and aliphatic or aromatic glycols.

In the method of making the cellular materials, the foaming may be produced by rapid stirring preferably in a commercial foam machine by reaction of an isocyanate with water or a carboxyl group to produce $CO_2$ upon decomposition of the excess diisocyanate. The foamed material may also be produced in a foam machine by gasifying a polyether-isocyanate at high pressure or by distributing $CO_2$ or a "Freon" gas etc. therein during the reaction stage.

In the ordinary method of making cellular polyurethane or foamed polyether diisocyanate reaction products, a viscous, liquid polyether is pumped at a controlled rate through a nozzle. Polyisocyanate, preferably a diisocyanate having two and only two isocyanate groups, is pumped, but at extremely high pressure, to the nozzle, where it contacts the stream of polyether and is thoroughly mixed therewith because of its high velocity. A small amount of water is also introduced into the nozzle either as a stream or in admixture with the polyether. A suitable catalyst, such as certain tertiary amines, is also preferably mixed with the polyether or introduced into the nozzle. A stirrer is also generally present in the nozzle to insure homogeneous mixing. From the nozzle, the material is incorporated into a suitable mold, such as an open pan, which is moved in a continuous manner relative to the nozzle to provide the desired layer of viscous reactants on the bottom of the pan or mold.

The bottom of the pan may contain upright cylindrical wooden pegs or cores so that the bottom surface of the polyurethane foam is formed with cored openings such as round cylindrical-shaped voids. These holes not only save material but allow the solid portion of the polyurethane foam to be of a higher density for a given load-deflection characteristic.

Polymerization starts as the materials are mixed and the semi-fluid mass is discharged into large pans. The material mixing is very important. It is essential that the diisocyanate and catalyst be almost immediately and completely dispersed in the polyether. The rate of polymerization is relatively fast and the mass is shaped by the contour of the pans. Carbon dioxide is evolved in the gaseous state from the time of mixing, discharging and shaping stages.

The foamed materials of the present invention may be formed by first reacting a polyether with a substantial excess of a diisocyanate over a 1:1 molar ratio in the absence of any water so as to form a dry partially reacted "pre-polymer" so that there are free isocyanate groups present. The "pre-polymer" is generally a viscous and flowable liquid, but if it is a waxy solid at room temperature, it can be made flowable by heating to 100 to 150° F. The anti-oxidants of the present invention may be incorporated with the polyalkylene ether glycol and polyisocyanate during the preparation of the prepolymer. Subsequently, the "prepolymer" is reacted with water, a polyurethane reaction catalyst such as a tertiary amine and preferably a cross-linking agent containing a plurality of labile hydrogens. There is a minimum of agitation employed after the initial dispersion of water in the "prepolymer" to prevent loss of $CO_2$. The amount of water used is generally 1 to 3 parts by weight based on 100 parts of prepolymer to provide carbon dioxide for a low density product, although as low as 0.5 parts by weight can be used to obtain benefits of this invention. When more than 5 parts of water are used, the urea linkages formed apparently cause a decrease in some of the desirable properties of the foamed material such as resiliency.

It has also been found that when a substantial part of the blowing action is provided by lithium-aluminum hydride, an excellent cellular material is obtained which is nearly twice as soft as other products prepared in the usual manner by using the reaction between isocyanate and water to provide $CO_2$ for the blowing action. The lithium aluminum hydride is preferably used in amounts of about 0.1 to 1% by weight of the prepolymer.

As to suitable polyethers in making elastomers, in order to make rubbery urethanes, i.e., those which are rubbery at normal temperatures, the molecular weight of the polyether glycol should be above 500 and preferably about 1500 to 2500. The maximum molecular weight of the polyether is dependent only upon the ability to economically make the polyethers of higher molecular weights with difunctionality, the higher molecular weights being preferred. Generally, it is exceedingly difficult to obtain polyethers with a molecular weight much above 3000 or 4000 without substantially higher costs and loss of some functionality.

The molar ratio of polyisocyanate to polyol is preferably about 8 to 1 to about 4 to 1 for suitable polyurethane foams, coatings and elastomers although benefits of this invention may be obtained with as low a molar ratio as 0.5 to 1 or as high as 10 or 12 to 1.

Generally for coatings, a range of about 1 to 3 moles per mole of polyol is used although polyether glycols may be used in the range of about 0.5 to 0.8 up to about 10 to 12 moles of diisocyanate per mole of polyether glycol.

As to using polyols for polyurethane coatings, the polyisocyanate and the polyol may be mixed in a solvent and spread upon the surface by similar means such as dipping, roller coating, knife coating, brushing or spraying. Upon heating the polymerization of the reaction products and evaporation of the solvent is accomplished.

For some purposes it may be desirable to substitute up to about 50% by weight of the polyethers by polyesters having a molecular weight of at least 500 such as poly (propylene-ethylene) adipate and polyethylene adipate and poly (ethylene-butylene-1,4) adipate. However, aging resistance suffers when the polyether glycols are less than 90% by weight of the total polyols present.

The polyisocyanate compounds used for preparing the cellular rubber, solid rubber and films of the present invention are preferably organic compounds having two active isocyanate groups. Suitable diisocyanates are various aromatic and aliphatic diisocyanates such as naphthalene - 1,5 - diisocyanate, tolylene diisocyanate, p,p'-diisocyanato diphenyl methane, durene diisocyanate (2,3,5,6-tetramethyl para phenylene diisocyanate) and hexamethylene diisocyanate or mixtures of these.

Some triisocyanates may be used in conjunction with a diisocyanate, such as described above, when more rigidity is desired or when the polyether has insufficient trifunctionality to give the desired degree of branching.

The following examples illustrate the present invention:

EXAMPLE I

A cellular foamed-polyurethane material was produced by first forming a substantially dry prepolymer of the following composition:

| Ingredients: | Parts by weight |
|---|---|
| Polypropylene ether glycol (molecular weight about 1800) | 300 |
| Tolylene diisocyanate (80/20 mixture of 2,4- and 2,6-tolylene diisocyanates) | 100 |

The prepolymer was formed by mixing the glycol and diisocyanate at about 60° C. The temperature of the reaction mixture was raised and maintained at 100° C. for about one-half hour and the mixture thereafter was cooled. Silicone oil, which helps in improving cell structure, and tri (nonyl phenyl) phosphite were dispersed in the prepolymer and then the reaction catalysts and cross-linking catalysts were added with rapid stirring to form a mixture. The composition of the mixture including the prepolymer and foaming components are shown below:

| Ingredients: | Parts by weight |
|---|---|
| Prepolymer | 100 |
| Silicone oil | 1 |
| Quadrol (N,N,N',N' - tetrakis (2 - hydroxy propyl) ethylene diamine) | 5 |
| Water | 2 |
| Dibutylamino ethanol | 1 |
| Tri (nonyl phenyl) phosphite | d |

In the above composition, the Quadrol may be substituted for by other cross-linking compounds containing a plurality of active hydrogens such as trimethylol propane, glycerol, hexanetriol, hexamethylene tetramine and the like.

The resultant mixture was poured into a mold and allowed to rise to its full height. Thereafter the raised foam material was cured for 15 hours at 100° C. A foamed material similar to the above was prepared in the same manner but without the tri (nonyl phenyl) phosphite. The foamed material with the phosphite was white and showed no discoloration, but the other foamed material sample, after the above curing cycle, had a deep yellow top skin and a yellow interior which greatly detracts from its utility and value. The foamed product containing the phosphite also exhibited improved flame resistance in addition to the improved stability to heat.

EXAMPLE II

A cellular foamed-polyurethane material was produced by first forming a substantially dry prepolymer of the following composition:

| Ingredients: | Parts by weight |
|---|---|
| Polypropylene ether glycol (molecular weight about 2000) | 500 |
| Tolylene diisocyanates comprising a 65/35 mixture of 2,4 and 2,6-toluene diisocyanates | 200 |
| Tri (nonyl phenyl) phosphite | 2.5 |

The prepolymer was formed as described in Example I by mixing the glycol and diisocyanate at about 60° C. in the presence of the tri (nonyl phenyl) phosphite. The temperature of the reaction mixture was raised and maintained at 100° C. for about one-half hour and the mixture thereafter was cooled. Silicone oil, was first dispersed in the prepolymer and then the reaction catalyst and cross-linking agents were added with rapid stirring to form a mixture. The composition of the prepolymer and foaming components are shown below:

| Ingredients: | Parts by weight |
|---|---|
| Prepolymer | 100 |
| Silicone oil | 1 |
| Cross-linking agent (Quadrol) | 5 |
| Water | 2 |
| Reaction catalyst (dibutyl amino ethanol) | 1 |

The resultant mixture was poured into a mold and allowed to rise to its full height. Thereafter the raised foam material was cured for 15 hours at 100° C. A foamed material similar to the above was prepared in the same manner but without the tri (nonyl phenyl) phosphite. The two foamed materials were exposed to an atmosphere of circulating hot moist air with a relative humidity of 95 to 100% and a temperature of 180° F. Changes in load deflection were obtained at the various periods of exposure as shown in Table 1.

*Table I*

| Exposure Time (Days) | Percent Change in Deflection of Foamed Material ||
|---|---|---|
| | (With phosphite) | (Without phosphite) |
| 7 | −11 | −16.9 |
| 14 | −22.2 | −27.4 |
| 21 | −31.7 | −37.8 |
| 28 | −31.3 | −42.0 |
| 35 | −34.4 | −56.0 |
| 42 | −35.7 | |
| 49 | −36.5 | |
| 56 | −38.9 | |

The foamed material made in accordance with the present invention definitely improves the ability of the product to resist humidity degradation.

Samples of the above foamed materials were also tested in a weather testing apparatus (Atlas Twin Arc Model DL-TS) and evaluated as to light discoloration as described in ASTM Test Designation D-822-46T, except that no water spray was used. This test is recognized as a good measure of the resistance of the sample to light embrittlement and discoloration. The sample containing the tri (nonyl phenyl) phosphite was slightly darker in color at the finish of the test than at the beginning but the foamed material without the benefit of the tri (nonyl phenyl) phosphite was considerably darker in color after the 192 hours exposure and its surface had become powdery and crumbly.

EXAMPLE III

A polyurethane coating composition was prepared by dissolving 100 parts of a polytetramethylene ether glycol of molecular weight 2600 and 6.4 parts of an 80:20 mixture of 2,4- and 2,6-toluene diisocyanates in a 75:15:10 mixture of methyl ethyl ketone, cyclohexanone and toluene to yield a solution containing 30% solids.

Before casting a film there is added to 100 parts of this solution, two parts of N-methyl morpholine catalyst and eight parts of a triisocyanate crosslinking agent prepared by the reaction of 3 moles of tolylene diisocyanate and one mole of trimethylol propane.

The solution was cast into films on glass and then cured for 30 minutes by heating at 210° F. One film was prepared as above while two films were prepared with the addition of 3% by weight of an organic phosphite, in one case tricresyl phosphite and in the other case tributyl phosphite.

The resultant cured films were stripped from the glass base and tested in the weathering test apparatus previously described for 192 hours. The film materials containing 3% by weight of tricresyl phosphite and tributyl phosphite showed a very slight discoloration while the film material without the phosphite compounds were greatly deteriorated being tacky and cheesy in nature.

EXAMPLE IV

A cellular foamed polyurethane rubber was produced as described in Example 1, except that the antioxidant compounds added were N,N'-disecondary octyl paraphenylene diamine and N,N'-disecondary butyl para-phenylene diamine in place of tri (nonyl phenyl) phosphite. The foamed materials produced were subjected to circulating moist air in an oven at 175° F. for two weeks. The following changes in percent deflection were recorded after the two weeks exposure:

| Material: | Percent change in deflection |
|---|---|
| Polyurethane material containing no anti-oxidant | −18 |
| Polyurethane material containing N,N'-disecondary octyl paraphenylene diamine | −8 |
| Polyurethane material containing N,N'-disecondary butyl para phenylene diamine | −3.7 |

The relatively small changes in percent deflection exhibited by the foams prepared with the phenylene diamines of the present invention illustrate the excellent humidity aging properties obtainable.

EXAMPLE V

A polyurethane film-forming composition was made in a manner similar to Example III except that a polytetra methylene ether glycol was dissolved in the methyl ethyl ketone-toluenecyclohexanone solvent. Again an 80–20 mixture of 2,4 and 2,6-toluene diisocyanate was also dissolved 30% by weight in a solvent to form a separate solution. The two solutions were mixed, cast, and cured as described in Example III except that, in place of the phosphites, N,N'-disecondary butyl para phenylene diamine and N,N'-disecondary octyl para phenylene diamine were used.

The films containing N,N'-disecondary octyl para phenylene diamine and N,N'-disecondary butyl paraphenylene diamine exhibited excellent resistance to age and weather when tested in the weather testing apparatus. In contrast, the control film containing no additives was greatly deteriorated both in color and in physical properties.

EXAMPLE VI

A series of cellular foamed-polyurethane materials was produced by first forming a prepolymer of the following composition:

| Ingredients: | Parts by weight |
|---|---|
| Polypropylene ether glycol (molecular weight about 1850) | 100 |
| 80/20 mixture of 2,4- and 2,6-toluene diisocyanates | 40 |
| Antioxidant | 0.5 |

Four prepolymers were prepared, one containing no antioxidant while the 3 other prepolymers contained one of the following antioxidants: 2,5-ditertiary butyl para cresol; 2,2'-methylene bis-(4-ethyl-6-tertiary butyl) phenol; and 2,5-ditertiary butyl hydroquinone.

The prepolymers were formed, as in Examples I and II, by mixing the glycol and diisocyanate at about 60° C. The temperature of the reaction mixture was raised and maintained at 100° C. for about one hour and the mixture thereafter was cooled. The silicone oil was first dispersed in the prepolymer and then the reaction catalysts N-methyl morpholine and dimethyl lauryl amine were added with rapid stirring to form a mixture. The composition showing the parts by weight of the prepolymer and foaming components is noted below:

| Ingredients: | Parts by weight |
|---|---|
| Prepolymer | 75 |
| Silicone oil | 0.10 |
| N-methyl morpholine | 1 |
| Dimethyl lauryl amine | 1 |
| Water | 1.6 |

The resultant mixture was then foamed and allowed to rise to its full height. The foamed materials produced were subjected to circulating moist air in an oven at 158° F. for nine weeks. The following changes in percent deflection were recorded after the nine weeks' exposure:

| Material: | Percent change in deflection |
|---|---|
| (A) Polyurethane material containing no antioxidant | −21.5 |
| (B) Polyurethane material containing 2,5-ditertiary butyl para cresol | +4.8 |
| (C) Polyurethane material containing 2,2'-methylene bis-(4-ethyl-6-tertiary butyl) phenol | +5.8 |
| (D) Polyurethane material containing ditertiary 2,5-butyl hydroquinone | +5.0 |

Internally, the foam sample A without additive was slightly tacky and appeared to have lost some of its properties. The interior of the foams B, C and D, both containing additives, appeared unchanged.

As noted above, an excellent retention in load deflection properties was observed even after nine weeks exposure which illustrates the excellent humidity aging properties obtained by using the polyaryl hydroxy compounds even at high temperatures. Samples of the same foamed materials were tested in the weather testing apparatus for a total of 192 hours. The foamed materials containing the polyaryl hydroxy compounds showed slight yellowing discoloration at the end of the long exposure time but the foamed samples without the polyaryl hydroxy compound were a very dark brown.

EXAMPLE VII

Films of polyurethane were prepared as in Example III except that polytetramethylene ether glycol with an average molecular weight of about 2600 was used as the polyether component and the elastomer itself was formulated with about a 5% molar excess of the polyether glycol over a 1:1 molar ratio with the diisocyanate. Again, as in Example III, the solutions were mixed with a trimethylol propane-TDI adduct which was in a 75% solution by weight of ethyl acetate, and cast on glass and cured by heating at 210° F. Films containing no additives were prepared as control films while other films were prepared which contained 2% by weight and 3% by weight respectively of 2,5-ditertiary butyl hydroquinone. The control or standard films containing no additive were highly discolored and lost almost all modulus and elongation properties. In contrast, the films containing 2% and 3% by weight of the hydroquinone retained nearly all of their original modulus and elongation properties and were only slightly discolored even after 96 hours exposure in the weather testing apparatus.

EXAMPLE VIII

Elastomers of polyurethane were prepared from the following amounts of polyether and diisocyanate:

| Material: | Amounts, mol |
|---|---|
| Polypropylene ether glycol molecular weight about 1800 | 1 |
| Diisocyanate (naphthalene-1,5-diisocyanate) | 1 |

The diisocyanate and polyether were mixed together and allowed to polymerize at a temperature of about 115° C. for a minimum time of two hours. Polymerization at room temperature requires a much longer time. A series of solid rubbers were prepared from the resultant polymer milling the polymer with a white pigment, calcium carbonate, and a suitable curing agent. Some solid rubber samples were prepared by also adding in 0.1% by weight of 4-methyl-6-tertiary butyl phenol and others were prepared with 1% and 2% by weight of 2,5-ditertiary butyl hydroquinone. As in the previous examples, control samples were made which contained no additive other than the white pigment and the curing agent. The combined polymers were then cured at about 30–60 pounds steam pressure at 10 to 120 minutes. When the elastomers were tested for resistance to aging and weathering in the weather testing apparatus, the solid elastomers without the hydroquinone additive were highly discolored exhibiting substantial surface darkening after even 24 hours exposure. The solid elastomers containing the 0.1% of phenol additive showed no substantial improvement over the control samples, indicating that an insufficient amount of polyhydroxy aryl compound was used in the sample. The solid elastomers containing 1% and 2% of the hydroquinone additive showed no substantial surface darkening or discoloration at the end of 24 hours exposure.

EXAMPLE IX

As in Example I, a series of prepolymers of polypropylene glycol and an 80/20 mixture of 2,4 and 2,6-tolylene diisocyanates were prepared. One-half percent by weight of the following compounds, considered effective antioxidants for rubbers, were added to the prepolymers in the course of their preparation:

(1) Mono-tertiary butyl hydroquinone
(2) Hydroquinone
(3) 3,4,5-tris-(alpha methyl benzyl) phenol
(4) Diphenylamine
(5) p-p'-Diamino diphenyl methane
(6) Meta-toluene diamine
(7) Para-phenyl phenol The addition of the above compounds, having active hydrogen atoms, to the prepolymers resulted in a premature gellation or at least a great increase in viscosity. The prepolymers gelled or increased in viscosity to such an extent that no foaming occurred when the water and tertiary amine reaction catalyst were added. When the above compounds such as mono-tertiary butyl hydroquinone and the like were used in solid elastomers and films of polyether-urethanes, they were also ineffective in preventing deterioration to heat and light. Apparently, reaction of the active hydrogen atoms with isocyanate groups prevents the compounds from acting in any desirable manner.

It is to be understood that in accordance with the provisions of the patent statutes, the particular form of product shown and described and the particular procedure set forth are presented for purposes of explanation and illustration and that various modifications of said product and procedure can be made without departing from our invention.

Having thus described our invention, what we claim is:

1. A method of preparing a heat and weather resistant polyurethane elastomer comprising the steps of mixing and reacting (1) about 0.5 moles to 12 moles of an organic diisocyanate, (2) about one mole of a dihydroxy terminated polyalkylene ether glycol having a molecular weight of at least 500, and (3) about 0.5 to 5% by weight based on the weight of said glycol and polyisocyanate of an antioxidant compound having stabilizing groups selected from a member of the group consisting of hydroxylated aryl, secondary amino, and $PO_3\equiv$, any active hydrogen atoms of which are sterically hindered by groups of at least 3 carbon atoms from reaction with said polyisocyanate under conditions of the reaction and said compound being selected from a member of the group consisting of (a) an organic phosphite having at least two of the hydrogens of phosphorous acid substituted by a member selected from the group consisting of alkaryl, alkyl, and aryl radicals, each of said alkaryl, alkyl, and aryl radicals having from 4 to 18 carbon atoms and said alkaryl and aryl radicals having 1 to 2 benzene ring structures, (b) an alkyl substituted hydroxy aryl compound having an alkyl group of three to eight carbon atoms located at a position ortho to each hydroxy group attached to the aryl ring structure, said aryl compound being selected from the group consisting of hydroxy-substituted benzene, diphenyl, and diphenyl methane, and (c) an N,N'-dialkyl substituted phenylene diamine according to the formula:

in which R and R' are alkyl groups of three to eight carbon atoms in which any alkyl groups having 3 carbon atoms are isopropyl groups.

2. A method as defined in claim 1 in which said polyisocyanate and said polyether are also reacted in the presence of about 0.5 to 5 parts by weight of water based on 100 parts by weight of weight of said polyisocyanate and said polyether.

3. A method as defined in claim 1 in which antioxidant is mixed with said polyether, thereafter said polyisocyanate and said polyether are mixed and reacted to form a substantially anhydrous liquid prepolymer, and thereafter said prepolymer is reacted with 0.5 to 5 parts by weight of water based on 100 parts by weight of said prepolymer.

4. A method as defined in claim 1 in which the polyisocyanate and polyalkylene ether glycol are reacted to form a polyurethane polymer and the resultant polymer is mixed with said antioxidant compound.

5. A method as defined in claim 1 in which the antioxidant is an organic phosphite having at least two of the hydrogens of phosphorous acid substituted by a member selected from the group consisting of alkaryl, alkyl, and aryl radicals, each of said alkaryl, alkyl and aryl radicals having from 4 to 18 carbon atoms and said aryl and alkaryl radicals having 1 to 2 benzene ring structures.

6. A method as defined in claim 1 in which the antioxidant is an alkyl substituted hydroxy aryl compound having an alkyl group of three to eight carbon atoms located at a position ortho to each hydroxy group attached to the aryl ring structure, any active hydrogens of which are sterically hindered by groups of at least three carbon atoms from reaction with isocyanate, said aryl compound being selected from the group consisting of hydroxy-substituted benzene, diphenyl and diphenyl methane.

7. A method as defined in claim 1 in which the antioxidant is an N,N'-dialkyl substituted phenylene diamine according to the formula:

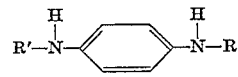

in which R and R' are alkyl groups of three to eight carbon atoms in which any alkyl groups having 3 carbon atoms are isopropyl groups.

8. A method as defined in claim 1 in which the antioxidant is tri(nonyl phenyl) phosphite.

9. A method as defined in claim 1 in which the antioxidant is a hydroxyl aryl compound having a substituted phenyl nucleus with a hydroxyl group in the first position and tertiary butyl groups in the 2 and 5 positions.

10. A method as defined in claim 1 in which the antioxidant is N,N'-disecondary-octyl paraphenylene diamine.

11. A product produced according to the method of claim 1.

12. A method of preparing a heat and weather resistant polyurethane elastomer comprising the steps of mixing and reacting (1) about .5 to 12 mols of a mixture of isocyanates having two to three functional isocyanate groups, a major portion of said mixture being diisocyanate, (2) about 1 mole of a dihydroxy terminated polyalkylene ether glycol having a molecular weight of at least 500, and (3) about 0.5 to 5% by weight based on the weight of said glycol and polyisocyanate of an antioxidant compound having stabilizing groups selected from a member of the group consisting of hydroxylated aryl, secondary amino, and $PO_3\equiv$, any active hydrogen atoms of which are sterically hindered by groups of at least 3 carbon atoms from reaction with said polyisocyanate under conditions of the reaction and said compound being selected from a member of the group consisting of (a) an organic phosphite having at least two of the hydrogens of phosphorous acid substituted by a member selected from the group consisting of alkaryl, alkyl, and aryl radicals, each of said alkaryl, alkyl, and aryl radicals having from 4 to 18 carbon atoms and said alkaryl and aryl radicals having 1 to 2 benzene ring structures, (b) an alkyl-substituted hydroxy aryl compound having an alkyl group of three to eight carbon atoms located at a position ortho to each hydroxy group attached to the aryl ring structure, said aryl compound being selected from the group consisting of hydroxy-substituted benzene, diphenyl, and diphenyl methane, and (c) an N,N'-dialkyl substituted phenylene diamine according to the formula:

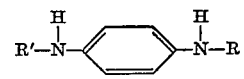

in which R and R' are alkyl groups of three to eight carbon atoms in which any alkyl groups having 3 carbon atoms are isopropyl groups.

References Cited in the file of this patent
UNITED STATES PATENTS

| | | |
|---|---|---|
| 2,692,873 | Langerak | Oct. 26, 1954 |
| 2,702,797 | Rugg | Feb. 22, 1955 |
| 2,749,960 | Schwartz | June 12, 1956 |
| 2,808,391 | Pattison | Oct. 1, 1957 |